May 5, 1959  E. J. HERBENAR  2,885,020
HYDRAULIC TYPE VEHICLE POWER STEERING DEVICE
Filed Nov. 9, 1953  2 Sheets-Sheet 1
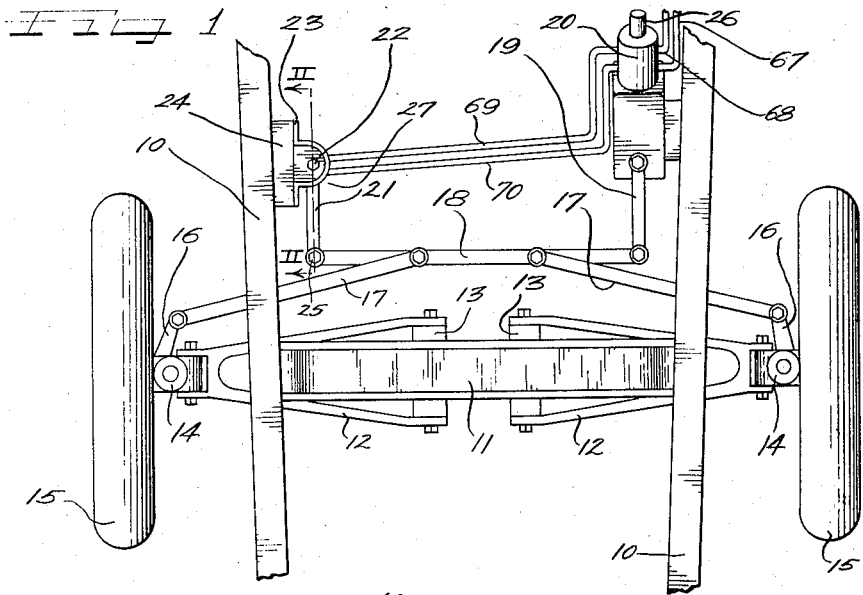
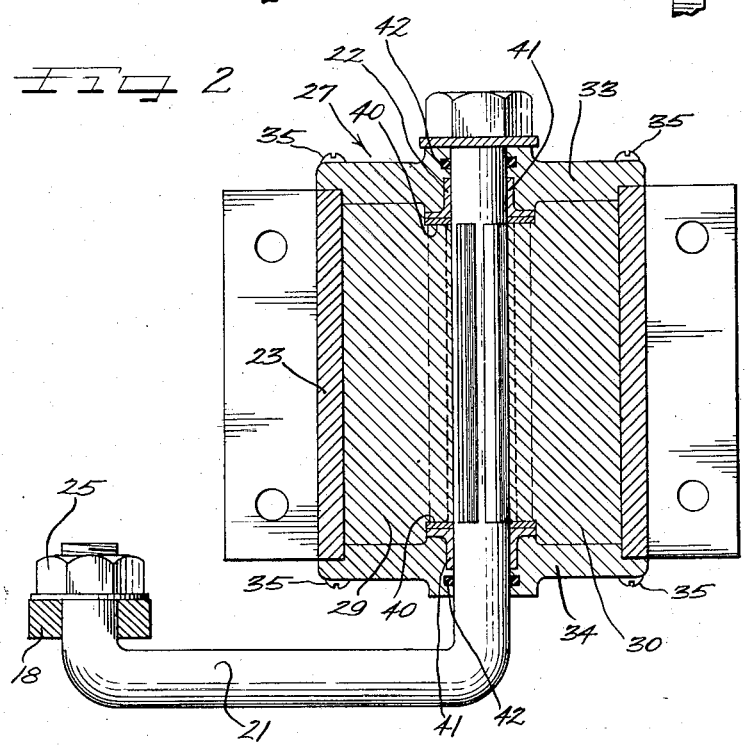
Inventor
Edward J. Herbenar

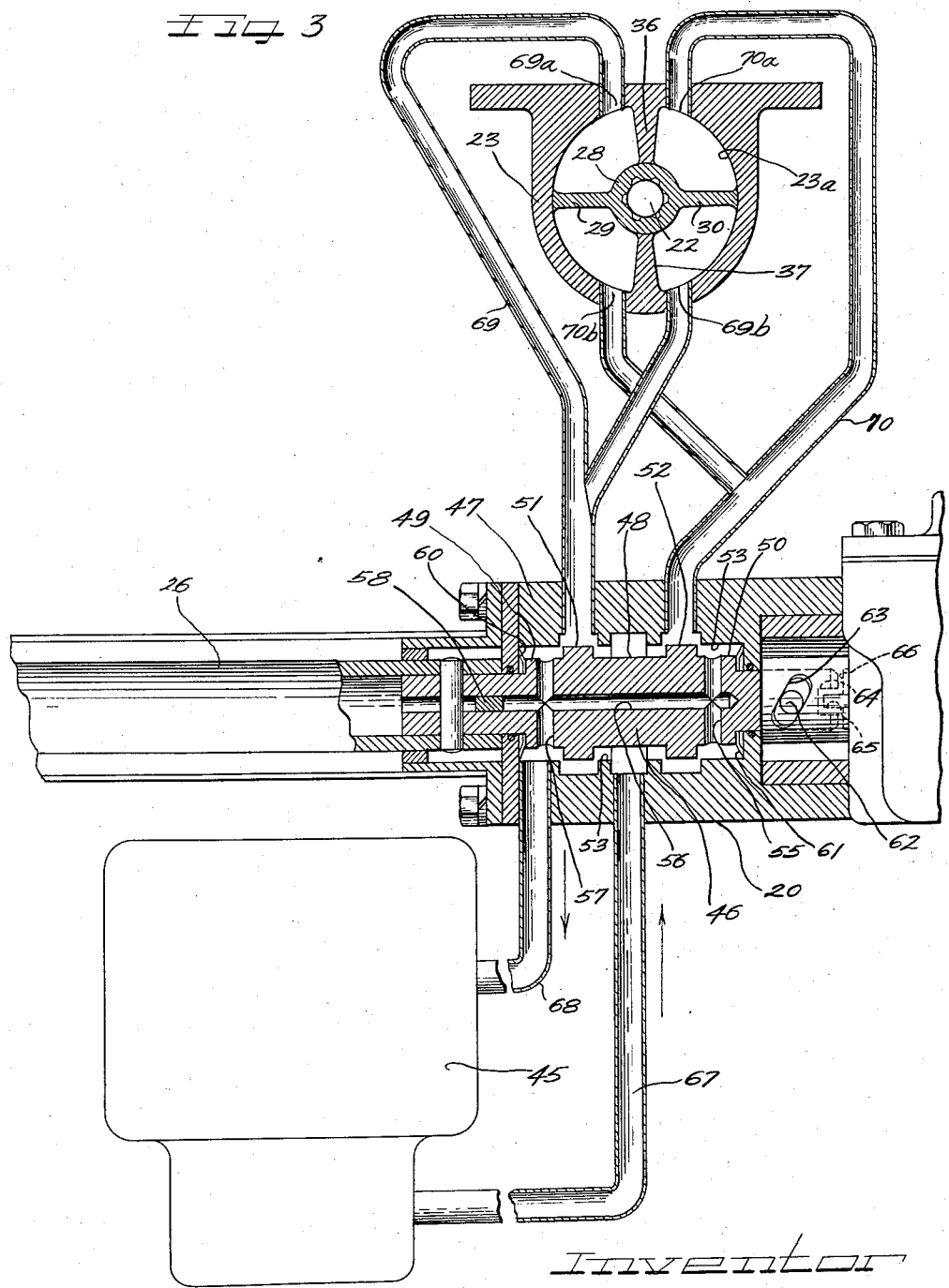

United States Patent Office 2,885,020
Patented May 5, 1959

2,885,020

HYDRAULIC TYPE VEHICLE POWER STEERING DEVICE

Edward J. Herbenar, Detroit, Mich., assignor to Thompson Products, Inc., Cleveland, Ohio, a corporation of Ohio Application November 9, 1953, Serial No. 390,893

2 Claims. (Cl. 180—79.2)

The present invention relates to a power steering system, and more particularly contemplates the provision of a novel power steering system and power motor therefor, for use in automotive vehicles.

A large number of power steering systems have been developed in the prior art. However, to my knowledge, these prior art systems have entailed rather complex linkage arrangements for the utilization of the necessary power motor whether electrical or hydraulic. These rather complex systems have made it difficult to provide a power steering system capable of simple installation as a substitute for the normal manual steering system ordinarily provided in automotive vehicles as standard equipment.

The present invention, on the other hand, provides a power steering system capable of installation in present day automobiles through a simple substitution of a single link of the original steering linkage, in combination with the substitution of a steering column carrying a control valve for providing the necessary automatic control of the power steering motor. This simplified power steering structure is accomplished through the use of a vane-type hydraulic motor carrying an operating lever which is secured to the vehicle frame at the mount already provided for the usual idler arm, now well known in the automotive art. The vane-type motor simultaneously provides a torque input to its lever, which acts as a substitute idler arm, and a rotating bearing support for the idler arm. The entire power system thus requires no additional space over the manual systems it replaces.

It is therefore, an object of the present invention to provide a power steering system for automotive vehicles in which the power source forms a part of the conventional steering linkage.

Another object of the present invention is to provide a power steering system in which a vane-type rotary hydraulic motor may be substituted for a conventional freely pivoted idler arm to provide a power source for the steering linkage.

Another object of the present invention is to provide a simplified power steering motor capable of substitution into a conventional, manually operable, steering system.

Still another object of the present invention is to provide a simplified vane-type power motor.

A feature of the present invention is a combined idler arm and power motor substitutable in a conventional steering linkage for vehicle wheels.

Another object of the present invention is to provide a rapidly acting power steering system utilizing a steering wheel torque responsive control valve in combination with a vane-type motor.

Yet another object of the present invention is to provide a rotary power source for vehicle steering systems and which may be connected directly into the conventional steering linkage.

Still other and further objects and features of the present invention will at once become apparent to those skilled in the art from a consideration of the attached sheet of drawings in which a single embodiment of the present invention is shown by way of illustration only, and wherein;

Figure 1 is a diagrammatic plan view of the steering linkage utilized in the present invention showing the relationship of the power steering apparatus thereto;

Figure 2 is an enlarged sectional view in elevation taken along the line II—II of Figure 1; and Figure 3 is a diagrammatic view of the power control system, partially in section, illustrating the operation thereof.

As shown on the drawings:

The power steering apparatus of the present invention is constructed for use in conventional automotive vehicles or the like having a rigid frame member 10 supporting a cross brace or axle 11. Wheel support arms 12 are pivotally supported at 13 to the member 11 and carry at their extremities conventional wheel spindle assemblies 14. The assemblies 14 pivotally carry wheel 15 for pivotal movement about a vertical axis in response to force supplied at the steering arms 16. The steering actuation of the wheels 15 through the steering arms 16 is accomplished through a conventional steering linkage comprising tie rods 17, drag link 18 and pitman arm 19.

In the conventional manual steering system now known in the art, and as above described, the steering apparatus would further include an idler arm freely pivoted to the frame 10 and to the drag link 18. Likewise, the pitman arm 19 would be operated through a conventional manual gear reduction means by the steering column shaft 26.

In the present system, however, the pitman arm 19 is operated by a steering column having a control valve 20 associated therewith, the operation of which will be described below. Further, at the opposite end of the drag link 18, an idler arm 21 is rigidly secured to a shaft 22 of a power motor 27 having a housing 23 which is in turn fixedly secured through a spacer block 24 to the frame 10.

As may be more fully seen in Figures 2 and 3, the vane-type power motor 27 comprises a rotor 28 having vanes 29 and 30 projecting radially therefrom. The rotor 28 is splined to the substantially vertically extending shaft 22 for rotation therewith and the combined rotor and shaft are mounted for rotation within the housing end plates 33 and 34 which are rigidly secured to the housing 23 by means of conventional fasteners 35.

Torque is applied to the shaft 22 by the rotor 28 in response to a build-up in the hydraulic pressure between the blades, or vanes, 29 and 30 and the fixed reaction vanes 36 and 37 extending from the inner wall 23a of the housing 23 into snug contact with the cylindrical rotor body 28. Thus, the direction of fluid under pressure into the cavity between the fixed blade 36 and the rotor blade 29 and the cavity between the fixed blade 37 and the rotor blade 30, will cause a counterclockwise torque as viewed in Figure 3 while a reverse or clockwise torque will be provided upon introduction of fluid under pressure into the cavities formed by the fixed blade 37 and rotor blade 30.

Rapidity of rotor operation is aided by the provision of the floating thrust plate 40 at each end of the rotor 28 as well as bushings 41. Leakage is prevented through the expediency of a rubber O ring 42 at each end of the motor unit. Further, in order to expedite the application of torque, a fast release is provided for the chambers not under the positive fluid pressure. Thus, upon the application of fluid under pressure to two diagonally opposite chambers as above described, the remaining two chambers will be fully vented to atmospheric pressure.

The fluid pressure utilized for the actuation of the rotor 28 and hence the idler arm 21, is supplied by a conventional hydraulic pump 45 under the control of a valve 20 actuated by the steering shaft 26 in response to loads imposed upon the pitman arm 19 by resistance of the vehicle to a steering motion.

The arrangement of the control is shown in Figure 3 in a diagrammatic form. There, a valve core 46 is secured for rotation and reciprocation with the steering shaft 26 and for rotation and reciprocation relative to the outer valve housing 47. The core 46 is provided with a central annular groove 48 and annular end recesses or grooves 49 and 50. These annular grooves are separated by the annular lands 51 and 52 which are constructed with an outside diameter substantially the same as the inside diameter 53 of the valve housing 47. The recess or grooved areas 49 and 50 are connected to each other by means of the interconnected passageways 55, 56, and 57. These passageways are preferably drilled in a conventional manner and, as shown, the drilled passageway 56 is blocked off by a tight plug 58 subsequent to the drilling operation to prevent the escape of fluid from the system.

When the steering shaft 26 is in a stationary position and no turning movement is applied to it, the valve core 46 will position itself as shown in Figure 3 in a neutral position. This positioning is maintained by the Belleville centering springs 60 and 61 which resist axial movement of the core 46 relative to the housing 47. However, upon the application of a rotative torque to the steering shaft 26, the core 46 is caused to reciprocate, overcoming the springs 60, through the action of a cam pin 62, which is secured to the core 46. The cam pin 62 cooperates with surface 63, which is axially fixed and which is secured for rotation with the conventional worm or steered element such as for example the pitman arm 19. A lost motion action is provided by the slot 64 and tongue 65 in the core 46 and the driven shaft 66 respectively so that upon initiation of rotation in the shaft 26, a reciprocation of the valve 46 will occur prior to an actual positive manual drive between the steering shaft 26 and the pitman arm 19 through the slot and groove connection 64, 65. Thus, upon rotation of the shaft 26 tending to cause a steering movement toward the right, and with the parts in the balanced position shown in Figure 3, the valve core 46 will move toward the left and conversely, upon the initiation of a force tending to steer the vehicle toward the left, the valve core will move toward the right as a result of the cam action of the pin 62 and slot 63.

Fluid under pressure is supplied to the system through the conduit 67 which connects with the annular groove 48 in the valve 46. A relief conduit 68 is provided in hydraulic communication with the end groove 47, though it is to be understood of course that this communication may be made with either the groove 49 or the groove 50 since these grooves are in hydraulic communication through the internal passageways in the valve core 46. Conduits 69 and 70 lead to the motor housing 10 and enter the walls thereof at 69a, 69b, 70a and 70b.

In operation, rotation of the shaft 26 to cause a right-hand steering movement, with the resultant left-hand reciprocation of the valve core 46 will cause fluid under pressure to flow from the conduit 67, into the groove 48 and from thence to the conduit 69 and into the chambers between the vanes 29, 36 and 30, 37, causing a rotation of the rotor 28 in a counterclockwise direction. As may be seen in Figure 1, this counterclockwise rotation will cause a counterclockwise rotation of the idler arm 21, and hence, steering movement of the wheels 15 toward the vehicle-right direction or a clockwise direction relative to the wheel supports 14 as viewed in Figure 1.

At the same time that pressure is applied urging the rotor 28 in the counterclockwise direction, the hydraulic fluid in the chambers formed by the vanes 29, 37 and 30, 36 is relieved to the reservoir relief conduit 68 through the conduit 70, the groove 50, the passageways 55, 56, 57, and the groove 49. Thus, the application of a plurality of rotatably mounted vanes in combination with a plurality of fixed vanes used with simultaneous pressure and venting, provides an extremely rapidly actuating vane-type fluid motor.

It is to be understood, that since the required amount of rotation of the idler arm 21 is ordinarily less than 90°, it is considered within the scope of the present invention to provide three vanes on the rotor 28 in combination with three fixed inwardly directed vanes on the housing 23, thus providing a maximum annular movement somewhat less than 120°.

If three vanes are used on the rotor, the torque output will of course be increased, or in the alternative, the dimensions of the motor may be decreased while retaining the same torque output as the larger two-vane unit. Further, while the conduits 69 and 70, may enter the casing 10 of the fluid motor in the manner shown, it is also contemplated that as an alternative, the openings 69a, 70a, 69b, and 70b may be provided in either one of the end plates 33 or 34. Whether the apertures are as shown in the drawings, or in the end plates, as suggested above, it is preferred that they be positioned in the lower end of the chambers so that fluid flow will constantly agitate the fluid within the chambers, thereby preventing sedimentation with possible jamming of the unit.

It will be understood that the present power system is operable upon the failure of the pump 45 since a positive drive or connection is provided between the tongue 65 and the slot 64 and, since actuation of the shaft 26 will automatically vent the hydraulic motor, whether or not fluid under pressure is supplied by the pump. In the reverse sense, however, the hydraulic motor acts as a shock absorber, since impacts supplied back through the system by the pitman arm 19 will be cushioned by the hydraulic fluid in all four chambers of the fluid motor. Thus, when the steering system is in the neutral position and shock is applied to the rotor 28, the four hydraulic chambers maintain the rotor 28 rigid, except for leakage past the lands 51 and 52 to the grooves 49 or 50 and from thence to the relief passage 68. The leakage permitted is sufficient to retain the necessary automatic straightening action desirable upon coming out of a turn, but is insufficient to permit rapid movement of the steering linkage from violent jars such as occur upon the impact of a single wheel against a pot hole or other obstruction in the road. Thus, the power steering system of the present invention provides a safety factor as well as a booster aid in actually steering the automotive vehicle.

An important feature of the structure of the present invention is its adaptability for substitution into already existing steering systems. Thus, the idler arm 21 is constructed to conform substantially to those already in service and the mounting bolts in the flanges 23 and spacer 24 are constructed to conform with the bolt holes already provided in the originally manufactured vehicle. Likewise, the steering column may be substituted in toto for that originally provided with the automobile. The conduits 67, 68, 69 and 70 are, preferably constructed of resilient material and may be conveniently routed through recesses in the automotive structure so as not to obstruct any of the parts of the automotive running gear.

It will be thus seen that a power steering system of the present invention may be very simply installed on present day vehicles without interfering in any way with the operation of the present steering linkages. Under the arrangement of this invention no hydraulic jacks and other similar bulky mechanisms are required and a very strong stabilizing or dampening force is supplied for the draglink 18, thereby greatly adding to the safety of the entire steering linkage. Further, the vane-type motor herein provided is extremely simple and simultaneously provides a satisfactory idler arm pivot, dashpot, and power source, thereby providing the necessary power at an absolute minimum of space.

It will be apparent that variations and modifications may be made in the above described structure without departing from the scope of the novel concepts of the present invention.

I claim as my invention:

1. A power steering system for a vehicle having a frame and a pair of dirigible wheels, comprising a steering arm associated with each of said wheels for pivoting said wheels about spaced substantially vertical axes, a drag link reciprocal transversely of the vehicle, connecting means securing each of said steering arms to said drag link for steering movement upon reciprocation of said drag link, an idler arm pivotally secured to one end of said drag link and rigidly secured to an upright shaft, combined motor and bearing means for said shaft and said idler arm comprising a fluid motor having a rotary output means secured to said upright shaft through a constant-torque connection, a compact rigid motor housing for enclosing said rotary output means, a pair of closely spaced bearings in said housing supporting said upright shafts on opposite sides of said constant-torque connection, means securing said housing rigidly to said frame, manual mechanical steering means connected to the other end of said drag link for reciprocation thereof, a valve connected to said manual steering means, means actuating said valve upon the application of steering torque to said manual steering means, fluid means connected to said valve and said fluid motor for actuation of said fluid motor upon actuation of said valve, said valve being mechanically independent of said motor housing and independent of the position of the motor output means.

2. A power steering system in accordance with the provisions of claim 1 wherein said upright shaft is integral with said idler arm.

References Cited in the file of this patent
UNITED STATES PATENTS

| | | |
|---|---|---|
| 1,859,333 | Josephs | May 24, 1932 |
| 1,876,104 | Tucker | Sept. 6, 1932 |
| 2,020,951 | Lemon | Nov. 12, 1935 |
| 2,151,998 | Stelzer | Mar. 28, 1939 |
| 2,230,361 | Morin et al. | Feb. 4, 1941 |
| 2,447,815 | Price | Aug. 24, 1948 |